United States Patent
Wu

(10) Patent No.: US 10,320,531 B2
(45) Date of Patent: Jun. 11, 2019

(54) DEVICE AND METHOD OF HANDLING A HYBRID AUTOMATIC REPEAT REQUEST ROUND-TRIP TIME TIMER IN A DISCONTINUOUS RECEPTION

(71) Applicant: HTC Corporation, Taoyuan (TW)

(72) Inventor: Chih-Hsiang Wu, Taoyuan (TW)

(73) Assignee: HTC Corporation, Taoyuan (TW)

(*) Notice: Subject to any disclaimer, the term of this patent is extended or adjusted under 35 U.S.C. 154(b) by 28 days.

(21) Appl. No.: 15/668,720

(22) Filed: Aug. 4, 2017

(65) Prior Publication Data

US 2018/0041310 A1 Feb. 8, 2018

Related U.S. Application Data

(60) Provisional application No. 62/371,244, filed on Aug. 5, 2016, provisional application No. 62/381,554, filed
(Continued)

(51) Int. Cl.
*H04L 1/18* (2006.01)
*H04W 76/28* (2018.01)
(Continued)

(52) U.S. Cl.
CPC .......... *H04L 1/1825* (2013.01); *H04L 1/1851* (2013.01); *H04L 1/1883* (2013.01);
(Continued)

(58) Field of Classification Search
CPC ... H04L 1/1012; H04L 1/1825; H04L 1/1851; H04L 1/1883; H04W 76/28
See application file for complete search history.

(56) References Cited

U.S. PATENT DOCUMENTS

| 8,976,764 B2 * | 3/2015 | Suzuki | H04L 1/1887 370/336 |
| 2011/0026625 A1 * | 2/2011 | Susitaival | H04W 52/0251 375/260 |

(Continued)

FOREIGN PATENT DOCUMENTS

| CN | 104244393 A | 12/2014 |
| TW | M350930 U1 | 2/2009 |

(Continued)

OTHER PUBLICATIONS

3GPP TS 36.321 V13.2.0 (Jun. 2016), "3rd Generation Partnership Project; Technical Specification Group Radio Access Network; Evolved Universal Terrestrial Radio Access (E-UTRA); Medium Access Control (MAC) protocol specification(Release 13)", XP051120005, pp. 1-91.

(Continued)

*Primary Examiner* — Shelly A Chase
(74) *Attorney, Agent, or Firm* — Winston Hsu

(57) ABSTRACT

A communication device for handling a HARQ RTT Timer comprises a storage device for storing instructions and a processing circuit coupled to the storage device. The processing circuit is configured to execute the instructions stored in the storage device. The instructions comprise receiving a first DCI on a DL control channel transmitted by a BS, or being configured a configured DL assignment; and starting a HARQ RTT Timer for the HARQ process, wherein the HARQ RTT Timer counts a time duration from a $(n+1)$-th TTI to a $(n+k+N+3+deltaPDCCH)$-th TTI.

15 Claims, 13 Drawing Sheets

Related U.S. Application Data on Aug. 30, 2016, provisional application No. 62/423,210, filed on Nov. 17, 2016.

(51) Int. Cl.
*H04L 12/841* (2013.01)
*H04L 29/08* (2006.01)

(52) U.S. Cl.
CPC .......... *H04L 1/1896* (2013.01); *H04L 47/283* (2013.01); *H04L 69/324* (2013.01); *H04W 76/28* (2018.02); *H04L 1/1858* (2013.01)

(56) References Cited

U.S. PATENT DOCUMENTS

2015/0312889 A1* 10/2015 Lee ................. H04L 1/1812 370/280
2017/0339682 A1* 11/2017 Lee ................. H04W 76/28

FOREIGN PATENT DOCUMENTS

| TW | I483589 | 5/2015 |
| TW | I492574 B | 7/2015 |
| TW | I500298 B | 9/2015 |
| TW | I502919 B | 10/2015 |

OTHER PUBLICATIONS

Search Report dated Dec. 11, 2017 for EP application No. 17185012.6, pp. 1-5.
3GPP TSG-RAN2 Meeting #96, R2-167652 Reno, USA, Nov. 14-18, 2016.
3GPP TSG-RAN2 Meeting #97, R2-1701512, Athens, Greece, Feb. 13-17, 2017.
Office action dated Sep. 10, 2018 for the Taiwan application No. 106126508, filed Aug. 7, 2017, pp. 1-3.

* cited by examiner

DEVICE AND METHOD OF HANDLING A HYBRID AUTOMATIC REPEAT REQUEST ROUND-TRIP TIME TIMER IN A DISCONTINUOUS RECEPTION

CROSS REFERENCE TO RELATED APPLICATIONS

This application claims the benefit of U.S. Provisional Applications No. 62/371,244 filed on Aug. 5, 2016, No. 62/381,554 filed on Aug. 30, 2016, and No. 62/423,210 filed on Nov. 17, 2016, which are incorporated herein by reference.

BACKGROUND OF THE INVENTION

1. Field of the Invention

The present invention relates to a device and a method used in a wireless communication system, and more particularly, to a device and a method of handling a Hybrid Automatic Repeat Request (HARQ) Round-trip Time (RTT) Timer in a discontinuous reception.

2. Description of the Prior Art

In a narrow band internet of things (NB-IoT) system, a length of a Hybrid Automatic Repeat Request (HARQ) Round-trip Time (RTT) Timer used for a HARQ process is set to (k+3+N+deltaPDCCH) transmission time intervals (TTIs), where k is an interval between the last TTI of a downlink (DL) transmission and the first TTI of an associated HARQ feedback transmission, N is a transmission duration in TTIs of the associated HARQ feedback, and the deltaPDCCH is an interval from the TTI of the HARQ transmission to the first TTI of a next Physical DL Control Channel (PDCCH) occasion.

SUMMARY OF THE INVENTION

The present invention therefore provides a communication device for handling a Hybrid Automatic Repeat Request (HARQ) Round-trip Time (RTT) Timer in a discontinuous reception (DRX) to solve the abovementioned problem.

A communication device for handling a HARQ RTT Timer comprises a storage device for storing instructions and a processing circuit coupled to the storage device. The processing circuit is configured to execute the instructions stored in the storage device. The instructions comprise receiving a first downlink (DL) control information (DCI) on a DL control channel transmitted by a base station (BS), or being configured a configured DL assignment, wherein the first DCI or the configured DL assignment indicates a first DL transmission comprising at least one repetition for a HARQ process of the communication device; and starting a HARQ RTT Timer for the HARQ process, wherein the HARQ RTT Timer counts a time duration from a (n+1)-th transmission time interval (TTI) to a (n+k+N+3+deltaPDCCH)-th TTI, wherein the n-th TTI comprises a last repetition of the at least one repetition; and k is a first interval between the n-th TTI and a first start TTI of a HARQ feedback associated to the first DL transmission, and N is a transmission duration in a plurality of TTIs of the HARQ feedback, and the deltaPDCCH is a second interval from (a last TTI of the plurality of TTIs+4 TTIs) to a second start TTI of a next Physical DL Control Channel (PDCCH) occasion or to a third start TTI of a next PDCCH candidate.

A communication device for handling a HARQ RTT Timer comprises a storage device for storing instructions and a processing circuit coupled to the storage device. The processing circuit is configured to execute the instructions stored in the storage device. The instructions comprise receiving a first DCI on a DL control channel transmitted by a BS, or being configured a configured UL grant, wherein the first DCI or the configured UL grant indicates the communication device to transmit at least one repetition of a first UL transmission using a HARQ process for the first UL transmission; and starting a UL HARQ RTT Timer for the HARQ process, wherein the UL HARQ RTT Timer counts a time duration from a (n+1)-th TTI to a (n+4+deltaPDCCH)-th TTI, wherein the n-th TTI comprises a last repetition of the at least one repetition, and the deltaPDCCH is an interval from (n+5)-th TTI to a first start TTI of a next PDCCH occasion or to a second start TTI of a next PDCCH candidate.

A communication device for handling a HARQ RTT Timer comprises a storage device for storing instructions and a processing circuit coupled to the storage device. The processing circuit is configured to execute the instructions stored in the storage device. The instructions comprise receiving a first DCI on a DL control channel transmitted by a BS, or being configured a configured DL assignment, wherein the first DCI or the configured DL assignment indicates a first DL transmission comprising at least one repetition for a HARQ process of the communication device; and starting or restarting a HARQ RTT Timer for the HARQ process, wherein the HARQ RTT Timer counts a time duration from a (n+1)-th transmission time interval (TTI) to a (n+k+N+3+deltaPDCCH)-th TTI, wherein the n-th TTI comprises a last repetition of the at least one repetition; and k is a first interval between the n-th TTI and a first start TTI of a HARQ feedback associated to the first DL transmission, and N is a transmission duration in a plurality of TTIs of the HARQ feedback, and the deltaPDCCH is a second interval from (a last TTI of the plurality of TTIs+3 TTIs) to a second start TTI of a next PDCCH occasion or to a third start TTI of a next PDCCH candidate, if (the first start TTI of the HARQ feedback+3 TTIs) is earlier than the second start TTI of the next PDCCH occasion or the third start TTI of the next PDCCH candidate.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
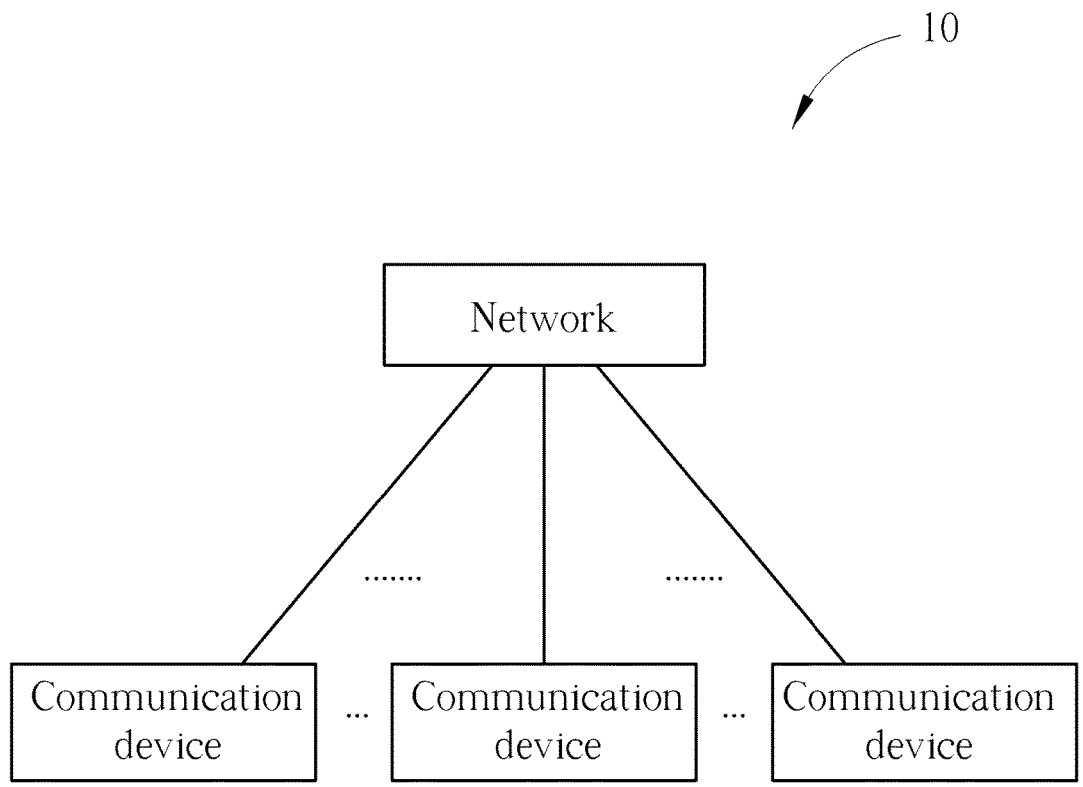
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. The network may be an evolved Universal Terrestrial Radio Access Network (E-UTRAN) comprising at least one evolved Node-B. The network may be a fifth generation (5G) network including at least one 5G BS which employs orthogonal frequency-division multiplexing (OFDM) or non-OFDM, wide bandwidth (e.g., 100 MHz) and a transmission time interval (TTI) smaller than 1 millisecond (ms) for communication with the communication devices is. In general, a BS is used for referring any of the eNB and the 5G BS.

A communication device may be a UE, a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
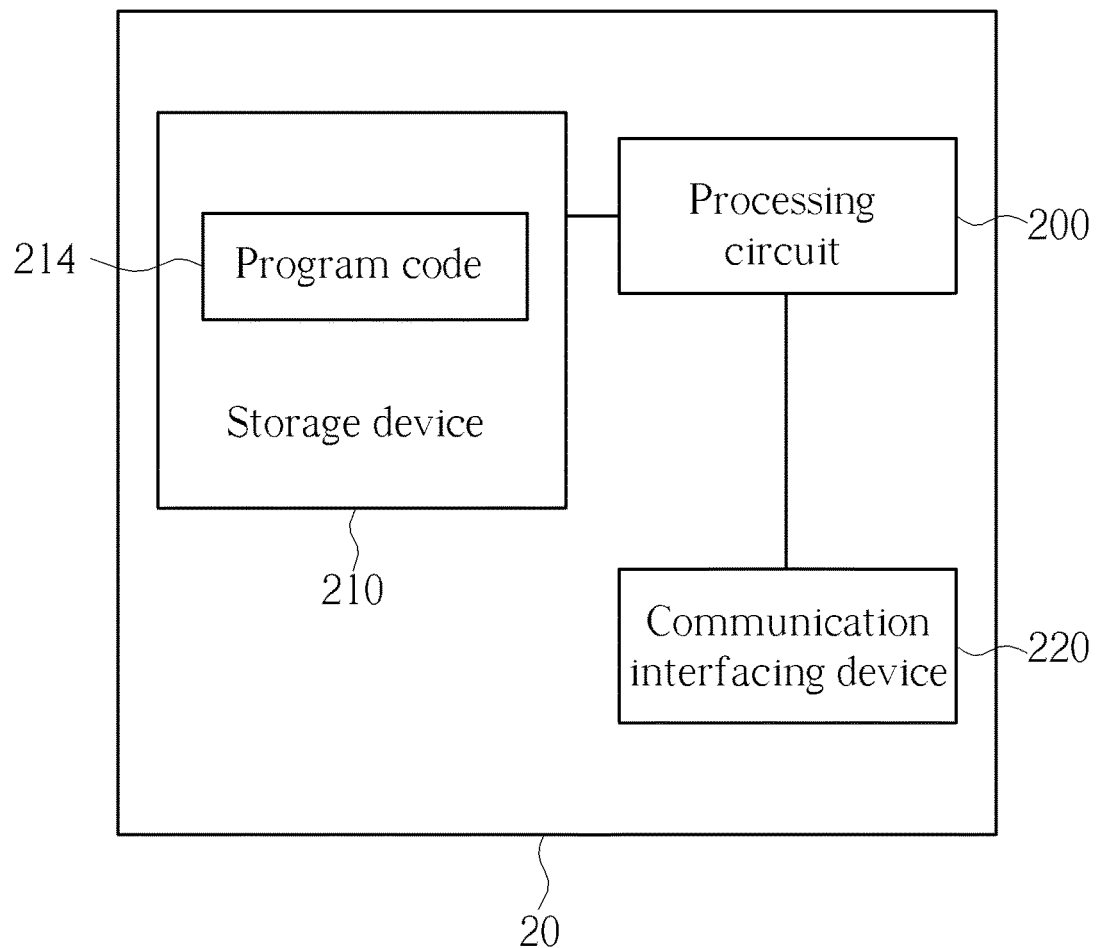
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The communication interfacing device 220 includes at least one transceiver transmitting and receiving signals (e.g., data, messages and/or packets) according to processing results of the processing circuit 200.

Figure 3:
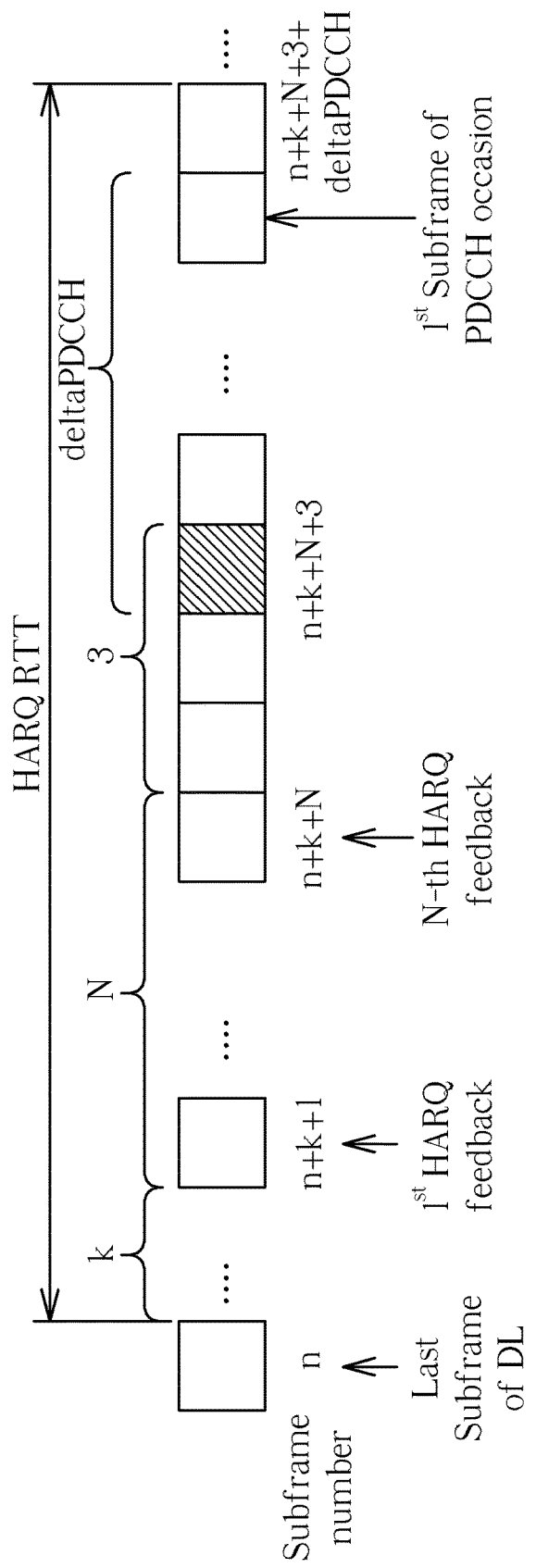
FIG. 3 is a schematic diagram of a length of a HARQ RTT Timer according to an example of the present invention.

FIG. 3 is a schematic diagram of a length of a Hybrid Automatic Repeat Request (HARQ) Round-trip Time (RTT) Timer according to an example of the present invention. A subframe (n+k+N+3) may unnecessarily be counted twice in the length. The HARQ RTT timer specifies the minimum amount of subframe(s) before a DL assignment for a HARQ retransmission is expected by a UE. A BS may unnecessarily wait one more subframe to schedule a retransmission. This causes inefficiency in retransmission.

In the following embodiments, a UE is used to represent a communication device in FIG. 1, to simplify the illustration of the embodiments.

Figure 4:
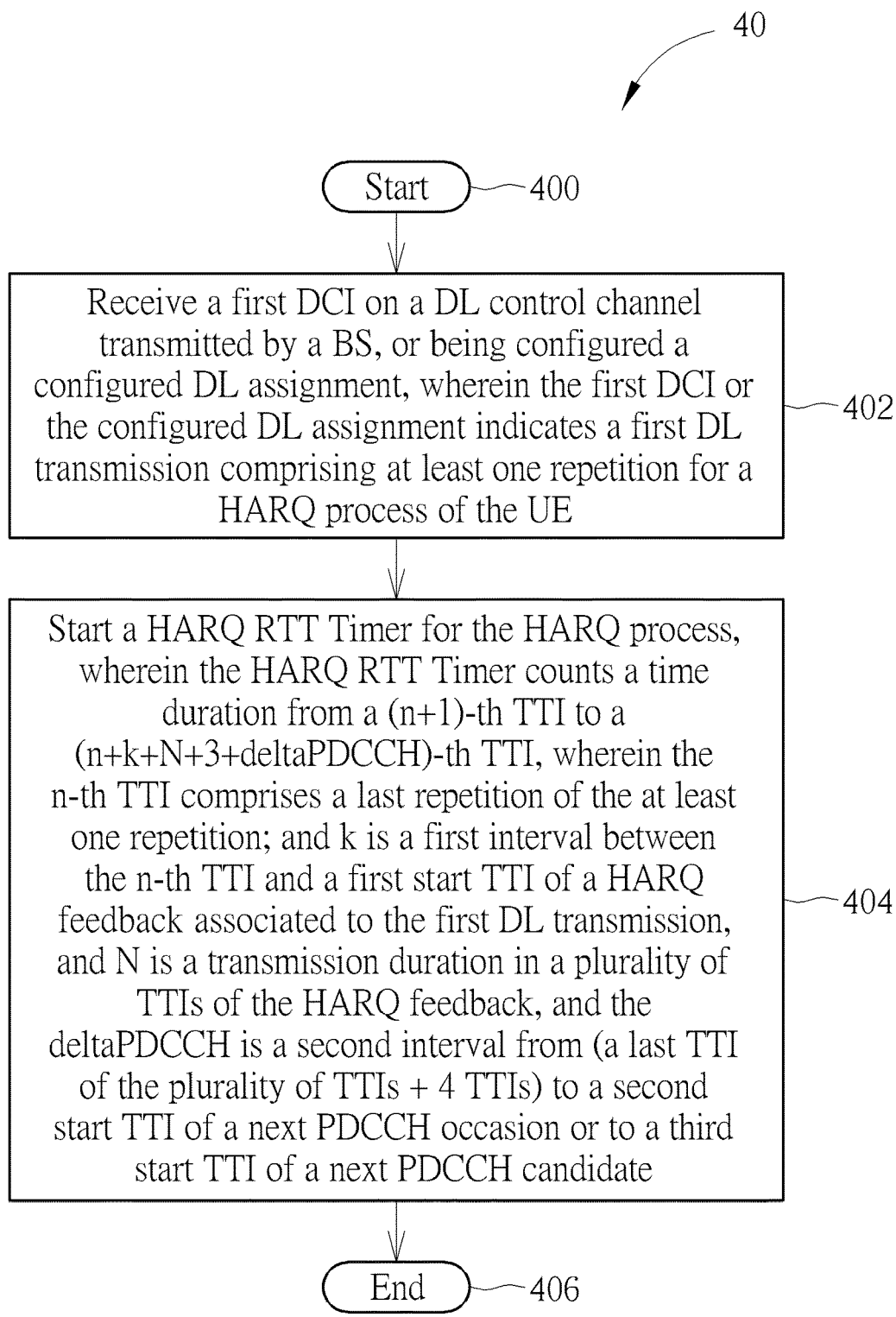
FIG. 4 is a flowchart of a process according to an example of the present invention.

FIG. 4 is a flowchart of a process 40 according to an example of the present invention. The process 40 can be utilized in a UE, for handling a HARQ RTT Timer. The process 30 includes the following steps:

Step 400: Start.

Step 402: Receive a first DL control information (DCI) on a DL control channel transmitted by a BS, or being configured a configured DL assignment, wherein the first DCI or the configured DL assignment indicates a first DL transmission comprising at least one repetition for a HARQ process of the UE.

Step 404: Start a HARQ RTT Timer for the HARQ process, wherein the HARQ RTT Timer counts a time duration from a (n+1)-th transmission time interval (TTI) to a (n+k+N+3+deltaPDCCH)-th TTI, wherein the n-th TTI comprises a last repetition of the at least one repetition; and k is a first interval between the n-th TTI and a first start TTI of a HARQ feedback associated to the first DL transmission, and N is a transmission duration in a plurality of TTIs of the HARQ feedback, and the deltaPDCCH is a second interval from (a last TTI of the plurality of TTIs+4 TTIs) to a second start TTI of a next Physical DL Control Channel (PDCCH) occasion or to a third start TTI of a next PDCCH candidate.

Step 406: End.

According to the process 40, the length of the HARQ RTT Timer is one TTI shorter than the length of the HARQ RTT Timer in the prior art. Thus, a BS can schedule a retransmission earlier.

Realization of the process 40 is not limited to the above description. The following examples may be applied to the process 40.

In one example, the deltaPDCCH is larger than or equals to 0. In one example, the first start TTI is the start TTI (i.e., first TTI) of the plurality of TTIs of the HARQ feedback. In one example, the second start TTI is the start TTI (i.e., the first TTI) of the earliest PDCCH occasion at or later than the (the last TTI+4 TTIs)-th TTI in the timeline.

In one example, the second start TTI is the start TTI (i.e., the first TTI) of the earliest PDCCH occasion later than the last TTI of the plurality of TTIs in the timeline. The deltaPDCCH is the interval from the (the last TTI of the plurality of TTIs+4 TTIs)-th TTI to the start TTI of the next PDCCH occasion (i.e., the second start TTI) or to the start TTI of the next PDCCH candidate (i.e., the third start TTI), if the start TTI of the next PDCCH occasion (i.e., the second start TTI) is the start TTI of the earliest PDCCH occasion at or later than the (the last TTI+4 TTIs) in the timeline. Otherwise, the deltaPDCCH is 0.

In one example, a first number of the at least one repetition of the first DL transmission is configured by the first DCI or by a Radio Resource Control (RRC) message (e.g., RRCConnectionReconfiguration message). In one example, a second number of the at least one repetition of the HARQ feedback is configured by the first DCI or by a RRC message.

In one example, the time duration may count a TTI before the (n+1)-th TTI in addition to the TTIs from the (n+1)-th TTI to the (n+k+N+3+deltaPDCCH)-th TTI described above, if the UE intends to start counting the time duration earlier than the (n+1)-th TTI.

In one example, when the BS intends to schedule the HARQ process after the n-th TTI, the BS may need to consider the time duration of the HARQ RTT Timer as described above. That is, the BS is not allowed to transmit (i.e., schedule) a second DCI to the UE before the (n+k+N+3+deltaPDCCH)-th TTI, if the HARQ feedback is a HARQ negative acknowledgement (NACK), wherein the second DCI indicates a retransmission of the first DL transmission for the HARQ process. The BS is not allowed to transmit (i.e., schedule) a third DCI to the UE before the (n+k+N+3+deltaPDCCH)-th TTI, if the HARQ feedback is a HARQ acknowledgement (ACK), wherein the third DCI indicates a second DL transmission for the HARQ process. Each of the first DCI, the second DCI and the third DCI may include a HARQ process number identifying the HARQ process. That is, the earliest TTI that the BS may schedule the retransmission or the new DL transmission for the HARQ process is the (n+k+N+3+deltaPDCCH)-th TTI. The BS may determine the deltaPDCCH as the UE does according to the above description.

In one example, the UE receives a discontinuous reception (DRX) configuration comprising a configuration of a drx-InactivityTimer, an onDurationTimer and a drx-ULRetransmissionTimer. When the time duration passes (i.e., the HARQ RTT Timer expires), the UE starts or restarts the drx-InactivityTimer at the (n+k+N+3+deltaPDCCH)-th TTI.

In one example, for a narrow band internet of things (NB-IoT) communication, the HARQ RTT Timer is set to (k+3+N+deltaPDCCH) TTIs. If (the last TTI of the associated HARQ feedback transmission+4 TTIs) equals to or is later than the first TTI of the next PDCCH occasion (or the next PDCCH candidate), the deltaPDCCH is 1.

Figure 5:
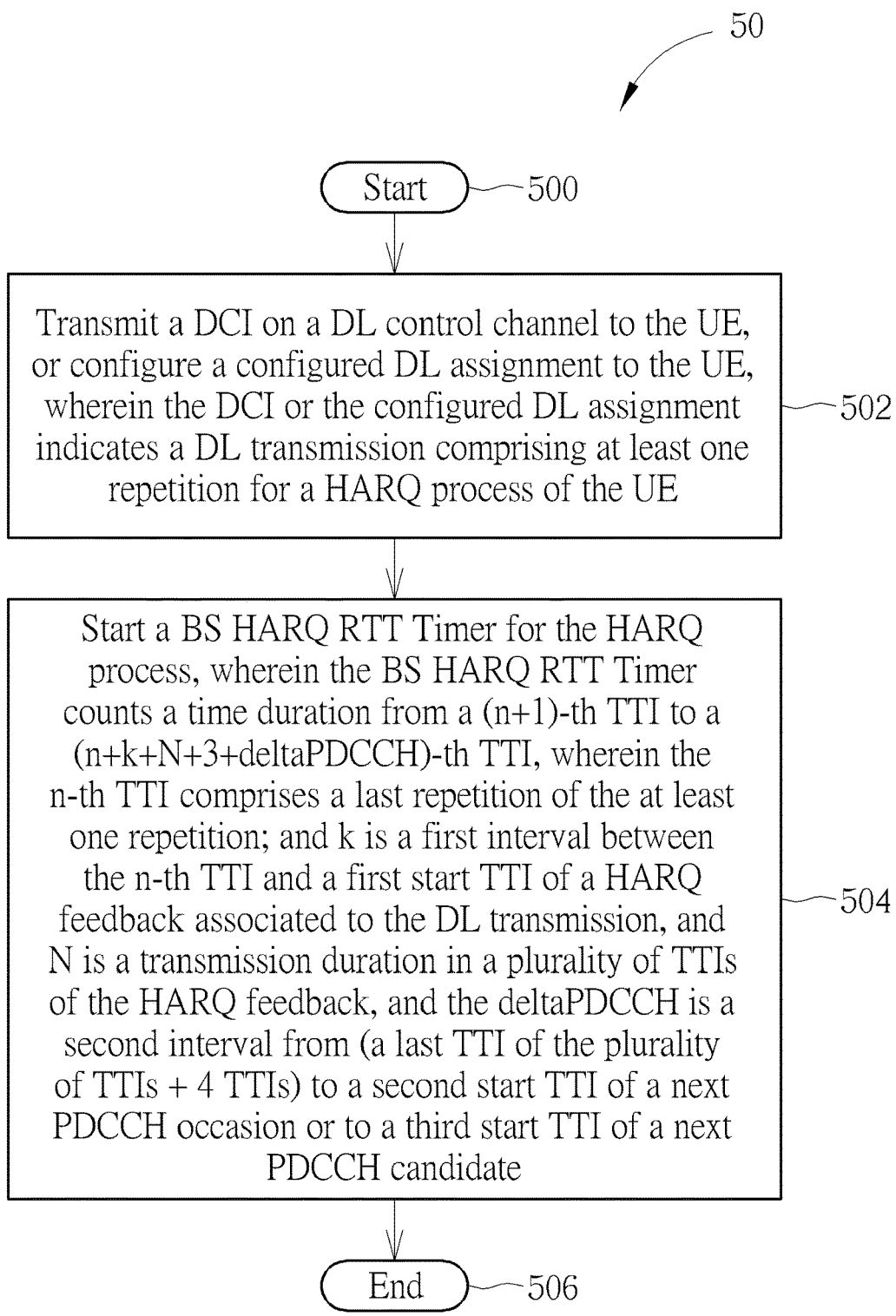
FIG. 5 is a flowchart of a process according to an example of the present invention.

FIG. 5 is a flowchart of a process 50 according to an example of the present invention. The process 50 can be utilized in a BS in a network, for handling a HARQ RTT Timer for a UE. The process 50 includes the following steps:

Step 500: Start.

Step 502: Transmit a DCI on a DL control channel to the UE, or configure a configured DL assignment to the UE, wherein the DCI or the configured DL assignment indicates a DL transmission comprising at least one repetition for a HARQ process of the UE.

Step 504: Start a BS HARQ RTT Timer for the HARQ process, wherein the BS HARQ RTT Timer counts a time duration from a (n+1)-th TTI to a (n+k+N+3+deltaPDCCH)-th TTI, wherein the n-th TTI comprises a last repetition of the at least one repetition; and k is a first interval between the n-th TTI and a first start TTI of a HARQ feedback associated to the DL transmission, and N is a transmission duration in a plurality of TTIs of the HARQ feedback, and the deltaPDCCH is a second interval from (a last TTI of the plurality of TTIs+4 TTIs) to a second start TTI of a next PDCCH occasion or to a third start TTI of a next PDCCH candidate.

Step 506: End.

The description for the processes above (e.g., the deltaPDCCH, the PDCCH occasion or the PDCCH candidate) may be applied to the process 50, and is not repeated herein.

Realization of the process 50 is not limited to the above description. The following examples may be applied to the process 50.

In one example, the BS configures a DRX operation to the UE by transmitting a DRX configuration which includes configuration of the drx-InactivityTimer, the onDurationTimer and the drx-ULRetransmissionTimer to the UE. The BS starts or restarts a BS drx-InactivityTimer, a BS onDurationTimer or a BS drx-ULRetransmissionTimer for the UE according to the DRX operation. In one example, when the time duration passes (i.e. the BS HARQ RTT Timer expires), the BS starts or restarts the BS drx-InactivityTimer at the (n+k+N+3+deltaPDCCH)-th TTI. The BS stops the BS drx-InactivityTimer, the BS onDurationTimer or the BS drx-ULRetransmissionTimer in a TTI when the BS transmits a random access response (RAR) to the UE and the RAR includes an UL grant for the TTI, when the BS configures a configured UL grant or a configured DL assignment for the TTI. The BS transmits a control command to the UE, when one of the BS drx-InactivityTimer, the BS onDurationTimer and the drx-ULRetransmissionTimer is running. The BS may not transmit the control command, when none of the BS drx-InactivityTimer, the BS onDurationTimer and the drx-ULRetransmissionTimer is running. In other words, the BS may need to consider whether the drx-InactivityTimer, the BS onDurationTimer or the BS drx-ULRetransmissionTimer is running or not (i.e., whether the UE is monitoring the control channel), when the BS needs to transmit the control command to the UE.

In one example, the BS configures the DRX operation to the UE (e.g., by transmitting a first RRC message (e.g., RRCConnectionReconfiguration message)) including the DRX configuration to the UE.

In one example, the BS transmits a Semi-Persistant Schedulung (SPS) DL assignment on the control channel to the UE to configure the configured DL assignment, wherein the configured DL assignment periodically assigned to the UE is for receiving DL transmissions periodically recurring in a plurality of TTIs. The BS may transmit a DL SPS periodicity (or called DL SPS scheduled interval, e.g., semiPersistSchedIntervalDL) in the first RRC message or in a second RRC message to the UE to indicate a periodicity of the configured DL assignment.

Figure 6:
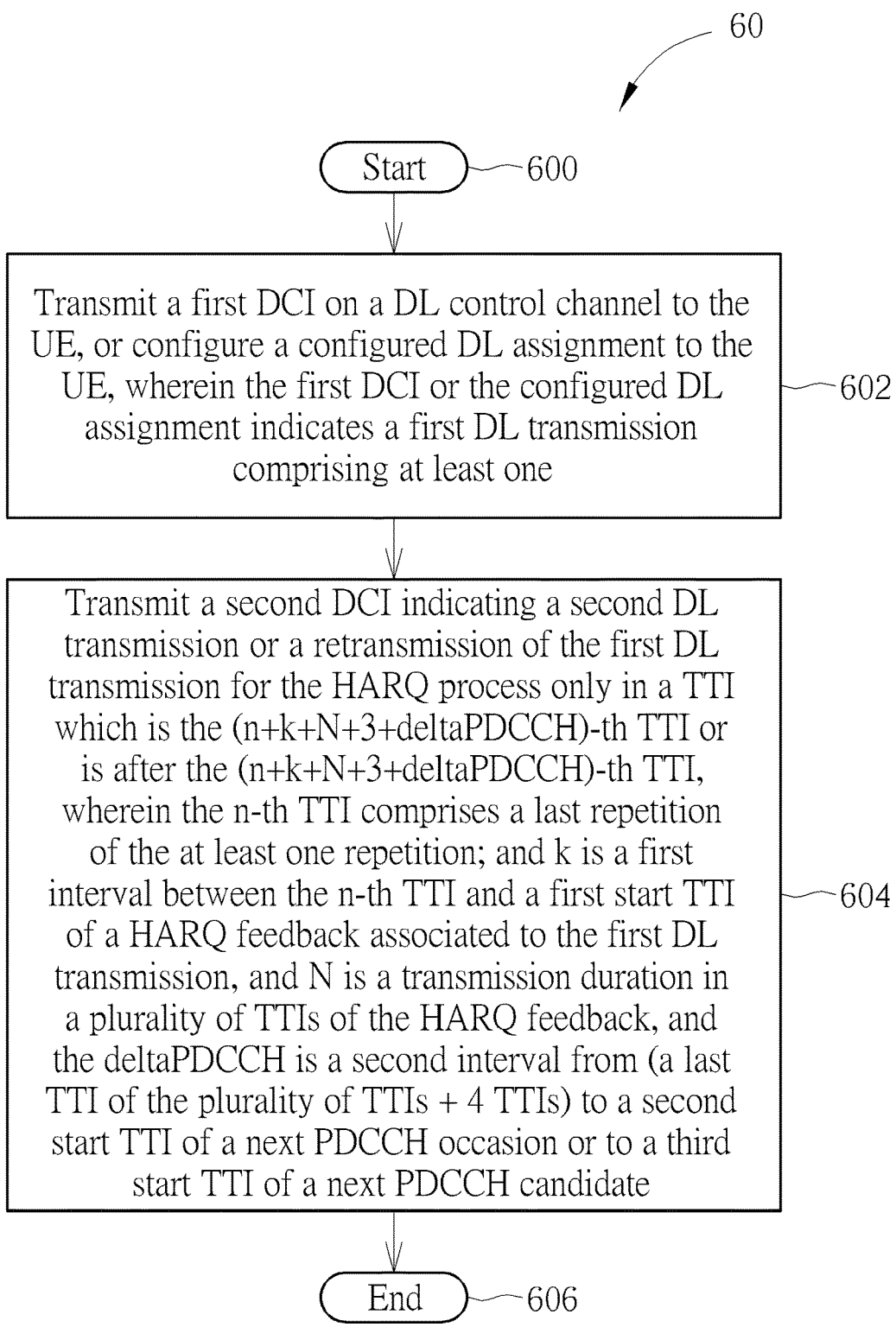
FIG. 6 is a flowchart of a process according to an example of the present invention.

FIG. 6 is a flowchart of a process 60 according to an example of the present invention. The process 60 can be utilized in a BS in a network, for handling a HARQ RTT Timer for a UE. The process 60 includes the following steps:

Step 600: Start.

Step 602: Transmit a first DCI on a DL control channel to the UE, or configure a configured DL assignment to the UE, wherein the first DCI or the configured DL assignment indicates a first DL transmission comprising at least one repetition for a HARQ process of the UE.

Step 604: Transmit a second DCI indicating a second DL transmission or a retransmission of the first DL transmission for the HARQ process only in a TTI which is the (n+k+N+3+deltaPDCCH)-th TTI or is after the (n+k+N+3+deltaPDCCH)-th TTI, wherein the n-th TTI comprises a last repetition of the at least one repetition; and k is a first interval between the n-th TTI and a first start TTI of a HARQ feedback associated to the first DL transmission, and N is a transmission duration in a plurality of TTIs of the HARQ feedback, and the deltaPDCCH is a second interval from (a last TTI of the plurality of TTIs+4 TTIs) to a second start TTI of a next PDCCH occasion or to a third start TTI of a next PDCCH candidate.

Step 606: End.

According to the process 60, the BS does not transmit the second DCI before the (n+k+N+3+deltaPDCCH)-th TTI. The UE considers the second DCI is invalid when the UE receives the second DCI before the (n+k+N+3+deltaPDCCH)-th TTI. The description for the processes above (e.g., the deltaPDCCH, the next PDCCH occasion or the next PDCCH candidate) may be applied to the process 60, and is not repeated herein.

Realization of the process 60 is not limited to the above description.

Figure 7:
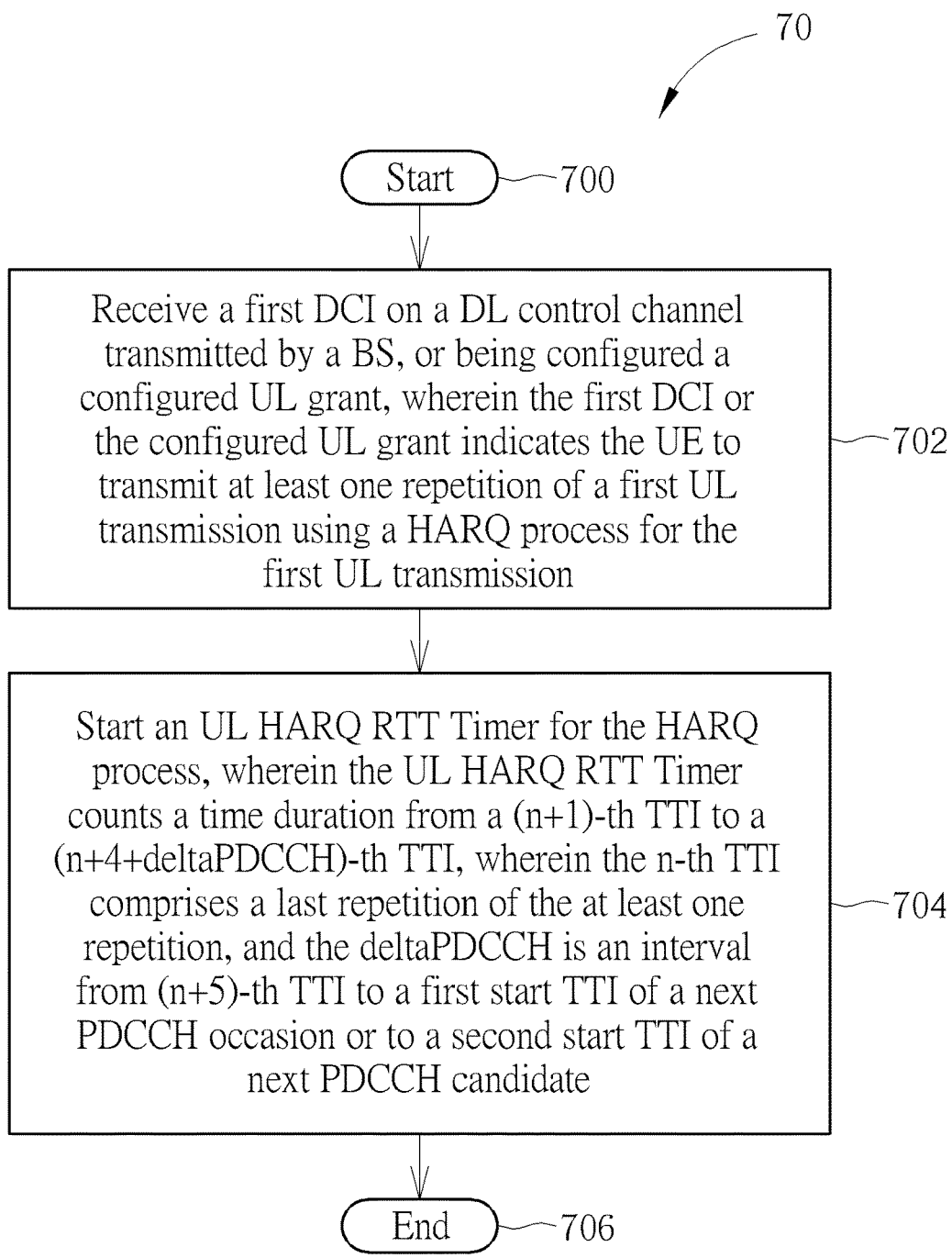
FIG. 7 is a flowchart of a process according to an example of the present invention.

FIG. 7 is a flowchart of a process 70 according to an example of the present invention. The process 70 can be utilized in a UE, for handling a HARQ RTT Timer. The process 70 includes the following steps:

Step 700: Start.

Step 702: Receive a first DCI on a DL control channel transmitted by a BS, or being configured a configured uplink (UL) grant, wherein the first DCI or the configured UL grant indicates the UE to transmit at least one repetition of a first UL transmission using a HARQ process for the first UL transmission.

Step 704: Start an UL HARQ RTT Timer for the HARQ process, wherein the UL HARQ RTT Timer counts a time duration from a (n+1)-th TTI to a (n+4+deltaPDCCH)-th TTI, wherein the n-th TTI comprises a last repetition of the at least one repetition, and the deltaPDCCH is an interval from (n+5)-th TTI to a first start TTI of a next PDCCH occasion or to a second start TTI of a next PDCCH candidate.

Step 706: End.

The description for the processes above (e.g., the deltaPDCCH, the next PDCCH occasion or the next PDCCH candidate) may be applied to the process 70, and is not repeated herein.

Realization of the process 70 is not limited to the above description. The following examples may be applied to the process 70.

In one example, the time duration counts a TTI from the (n+1)-th TTI to the (n+k+N+3+deltaPDCCH)-th TTI according to the above description, if the UE intends to start counting the time duration earlier than the (n+1)-th TTI.

In one example, when the BS intends to schedule the HARQ process after the n-th TTI, the BS may need to consider the time duration of the HARQ RTT Timer according to the above description. That is, the BS is not allowed to transmit (e.g., schedule) a second DCI to the UE before the (n+4+deltaPDCCH)-th TTI, if the BS does not receive the first UL transmission successfully, wherein the second DCI indicates a retransmission of the first UL transmission for the HARQ process. The BS is not allowed to transmit (e.g., schedule) a third DCI to the UE before the (n+4+deltaPDCCH)-th TTI, if the BS receives the first UL transmission successfully, wherein the third DCI indicates a second UL transmission for the HARQ process. Each of the first DCI, the second DCI and the third DCI includes or does not include a HARQ process number identifying the HARQ process. That is, the earliest TTI that the BS may schedule the retransmission or the new UL transmission for the HARQ process is the (n+4+deltaPDCCH)-th TTI. The BS determines the deltaPDCCH as the UE does as described above.

In one example, the UE receives a DRX configuration comprising a configuration of a drx-InactivityTimer, an onDurationTimer and a drx-ULRetransmissionTimer. When the time duration passes (i.e., the UL HARQ RTT Timer expires), the UE starts or restarts the drx-InactivityTimer at the (n+4+deltaPDCCH)-th TTI.

In one example, for a NB-IoT communication, the HARQ RTT Timer is set to (4+deltaPDCCH) TTIs.

Figure 8:
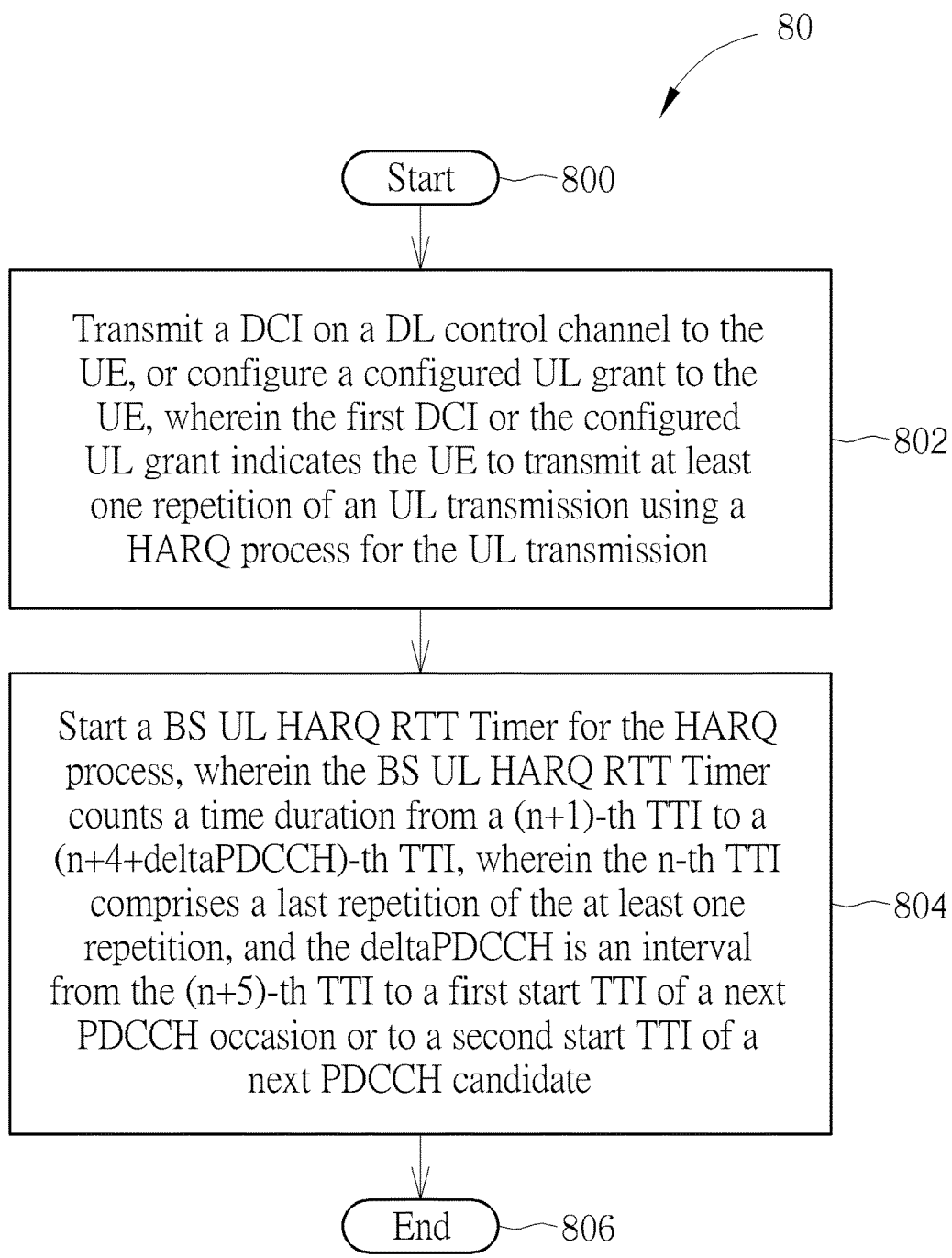
FIG. 8 is a flowchart of a process according to an example of the present invention.

FIG. 8 is a flowchart of a process 80 according to an example of the present invention. The process 80 can be utilized in a BS in a network, for handling a HARQ RTT Timer for a UE. The process 80 includes the following steps:

Step 800: Start.

Step 802: Transmit a DCI on a DL control channel to the UE, or configure a configured UL grant to the UE, wherein the DCI or the configured UL grant indicates the UE to transmit at least one repetition of an UL transmission using a HARQ process for the UL transmission.

Step 804: Start a BS UL HARQ RTT Timer for the HARQ process, wherein the BS UL HARQ RTT Timer counts a time duration from a (n+1)-th TTI to a (n+4+deltaPDCCH)-th TTI, wherein the n-th TTI comprises a last repetition of the at least one repetition, and the deltaPDCCH is an interval from the (n+5)-th TTI to a first start TTI of a next PDCCH occasion or to a second start TTI of a next PDCCH candidate.

Step 806: End.

The description for the process 70 (e.g., the deltaPDCCH, the next PDCCH occasion or the next PDCCH candidate) may be applied to the process 80, and is not repeated herein.

Figure 9:
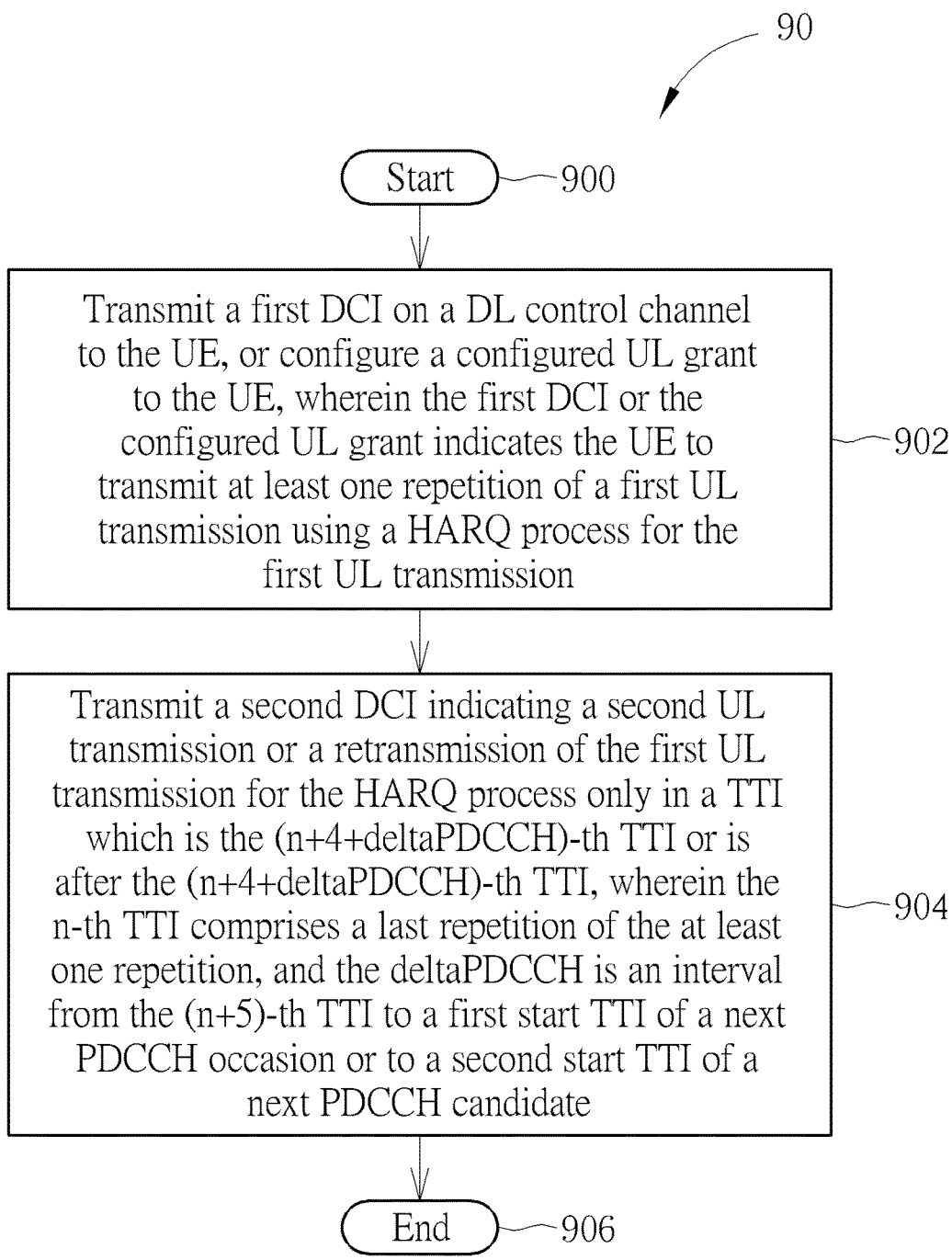
FIG. 9 is a flowchart of a process according to an example of the present invention.

FIG. 9 is a flowchart of a process 90 according to an example of the present invention. The process 90 can be utilized in a BS in a network, for handling a HARQ RTT Timer for a UE. The process 90 includes the following steps:

Step 900: Start.

Step 902: Transmit a first DCI on a DL control channel to the UE, or configure a configured UL grant to the UE, wherein the first DCI or the configured UL grant indicates the UE to transmit at least one repetition of a first UL transmission using a HARQ process for the first UL transmission.

Step 904: Transmit a second DCI indicating a second UL transmission or a retransmission of the first UL transmission for the HARQ process only in a TTI which is the (n+4+deltaPDCCH)-th TTI or is after the (n+4+deltaPDCCH)-th TTI, wherein the n-th TTI comprises a last repetition of the at least one repetition, and the deltaPDCCH is an interval from the (n+5)-th TTI to a first start TTI of a next PDCCH occasion or to a second start TTI of a next PDCCH candidate.

Step 906: End.

The description for the processes above (e.g., the deltaPDCCH, the next PDCCH occasion or the next PDCCH candidate) may be applied to the process 90, and is not repeated herein.

Figure 10:
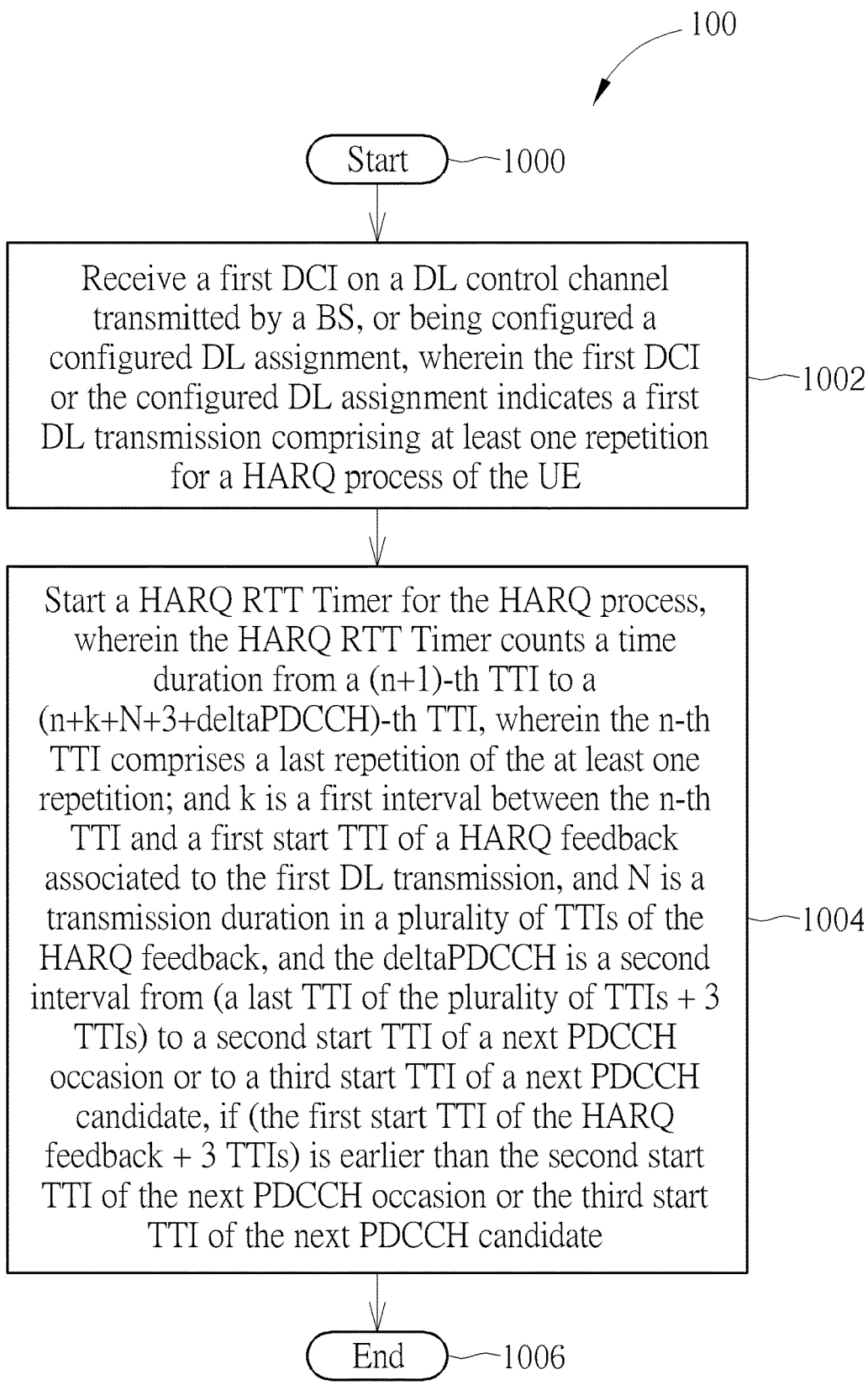
FIG. 10 is a flowchart of a process according to an example of the present invention.

FIG. 10 is a flowchart of a process 100 according to an example of the present invention. The process 100 can be utilized in a UE, for handling a HARQ RTT Timer. The process 100 includes the following steps:

Step 1000: Start.

Step 1002: Receive a first DCI on a DL control channel transmitted by a BS, or being configured a configured DL assignment, wherein the first DCI or the configured DL assignment indicates a first DL transmission comprising at least one repetition for a HARQ process of the UE.

Step 1004: Start a HARQ RTT Timer for the HARQ process, wherein the HARQ RTT Timer counts a time duration from a (n+1)-th TTI to a (n+k+N+3+deltaPDCCH)-th TTI, wherein the n-th TTI comprises a last repetition of the at least one repetition; and k is a first interval between the n-th TTI and a first start TTI of a HARQ feedback associated to the first DL transmission, and N is a transmission duration in a plurality of TTIs of the HARQ feedback, and the deltaPDCCH is a second interval from (a last TTI of the plurality of TTIs+3 TTIs) to a second start TTI of a next PDCCH occasion or to a third start TTI of a next PDCCH candidate, if (the first start TTI of the HARQ feedback+3 TTIs) is earlier than the second start TTI of the next PDCCH occasion or the third start TTI of the next PDCCH candidate.

Step 1006: End.

The description for the processes 40, 50 and 60 (e.g., the deltaPDCCH, the next PDCCH occasion or the next PDCCH candidate) may be applied to the process 100, and is not repeated herein.

Realization of the process 90 is not limited to the above description. The following examples may be applied to the process 90.

In one example, the deltaPDCCH may be 1, if (a last TTI of the HARQ feedback+3 TTIs) is or is later than the second start TTI of the next PDCCH occasion or the third start TTI of the next PDCCH candidate.

In one example, the time duration counts a TTI from the (n+1)-th TTI to the (n+k+N+3+deltaPDCCH)-th TTI according to the above description, if the UE intends to start counting the time duration earlier than the (n+1)-th TTI.

In one example, when the BS intends to schedule the HARQ process after the n-th TTI, the BS may need to consider the time duration of the HARQ RTT Timer according to the above description. That is, the BS is not allowed to transmit (i.e., schedule) a second DCI to the UE before the (n+k+N+3+deltaPDCCH)-th TTI, if the HARQ feedback is a HARQ NACK, wherein the second DCI indicates a retransmission of the first DL transmission for the HARQ process. The BS is not allowed to transmit (i.e., schedule) a third DCI to the UE before the (n+k+N+3+deltaPDCCH)-th TTI, if the HARQ feedback is a HARQ ACK, wherein the third DCI indicates a second DL transmission for the HARQ process. Each of the first DCI, the second DCI and the third DCI may include a HARQ process number identifying the HARQ process. That is, the earliest TTI that the BS can schedule the retransmission or the new DL transmission for the HARQ process is the (n+k+N+3+deltaPDCCH)-th TTI. The BS may determine the deltaPDCCH as the UE does according to the above description.

In one example, the UE receives a DRX configuration comprising a configuration of a drx-InactivityTimer, an onDurationTimer and a drx-ULRetransmissionTimer. When the time duration passes (i.e., the HARQ RTT Timer expires), the UE starts or restarts the drx-InactivityTimer at the (n+k+N+3+deltaPDCCH)-th TTI or at the (n+k+N+3+1)-th TTI according to the above description.

In one example, for a NB-IoT communication, the HARQ RTT Timer is set to (k+3+N+deltaPDCCH) TTIs. If (the last TTI of the associated HARQ feedback transmission+3 TTIs) equals to or is later than the first TTI of the next PDCCH occasion (or the next PDCCH candidate), the deltaPDCCH is 1.

Figure 11:
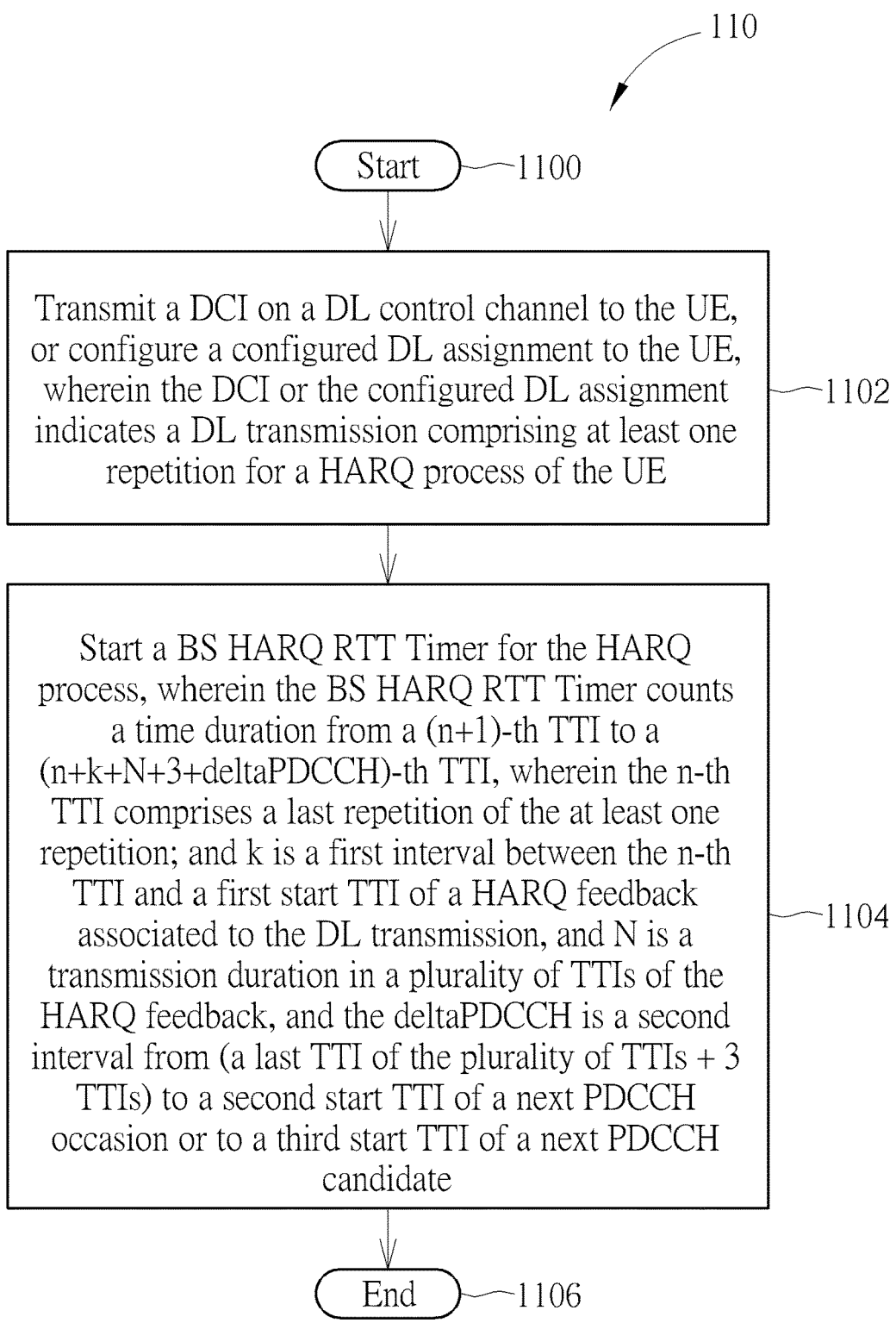
FIG. 11 is a flowchart of a process according to an example of the present invention.

FIG. 11 is a flowchart of a process 110 according to an example of the present invention. The process 110 can be utilized in a BS in a network, for handling a HARQ RTT Timer for a UE. The process 110 includes the following steps:

Step 1100: Start.

Step 1102: Transmit a DCI on a DL control channel to the UE, or configure a configured DL assignment to the UE, wherein the DCI or the configured DL assignment indicates a DL transmission comprising at least one repetition for a HARQ process of the UE.

Step 1104: Start a BS HARQ RTT Timer for the HARQ process, wherein the BS HARQ RTT Timer counts a time duration from a (n+1)-th TTI to a (n+k+N+3+deltaPDCCH)-th TTI, wherein the n-th TTI comprises a last repetition of the at least one repetition; and k is a first interval between the n-th TTI and a first start TTI of a HARQ feedback associated to the DL transmission, and N is a transmission duration in a plurality of TTIs of the HARQ feedback, and the deltaPDCCH is a second interval from (a last TTI of the plurality of TTIs+3 TTIs) to a second start TTI of a next PDCCH occasion or to a third start TTI of a next PDCCH candidate.

Step 1106: End.

The description for the process 100 (e.g., the deltaPDCCH, the next PDCCH occasion or the next PDCCH candidate) may be applied to the process 110, and is not repeated herein.

Realization of the process 110 is not limited to the above description. The following examples may be applied to the process 110.

In one example, the deltaPDCCH may be 1, if (a last TTI of the plurality of TTIs of the HARQ feedback+3 TTIs) is or is later than the second start TTI of the next PDCCH occasion or the third start TTI of the next PDCCH candidate.

In one example, the BS configures a DRX operation to the UE by transmitting a DRX configuration which includes configuration of the drx-InactivityTimer, the onDurationTimer and the drx-ULRetransmissionTimer to the UE. The BS starts or restarts a BS drx-InactivityTimer, a BS onDurationTimer or a BS drx-ULRetransmissionTimer for the UE according to the DRX operation. In one example, when the time duration passes (i.e. the BS HARQ RTT Timer expires), the BS starts or restarts the BS drx-InactivityTimer at the (n+k+N+3+deltaPDCCH)-th TTI or at the (n+k+N+3+1)-th TTI according to the above description. The BS stops the BS drx-InactivityTimer, the BS onDurationTimer or the BS drx-ULRetransmissionTimer in a TTI when the BS transmits a RAR to the UE and the RAR includes an UL grant for the TTI, when the BS configures a configured UL grant or a configured DL assignment for the TTI. The BS transmits a control command to the UE, when one of the BS drx-InactivityTimer, the BS onDurationTimer and the drx-ULRetransmissionTimer is running. The BS may not transmit the control command, when none of the BS drx-InactivityTimer, the BS onDurationTimer and the drx-ULRetransmissionTimer is running. In other words, the BS may need to consider whether the drx-InactivityTimer, the BS onDurationTimer or the BS drx-ULRetransmissionTimer is running or not (i.e. the UE is monitoring the control channel), when the BS needs to transmit the control command to the UE.

Figure 12:
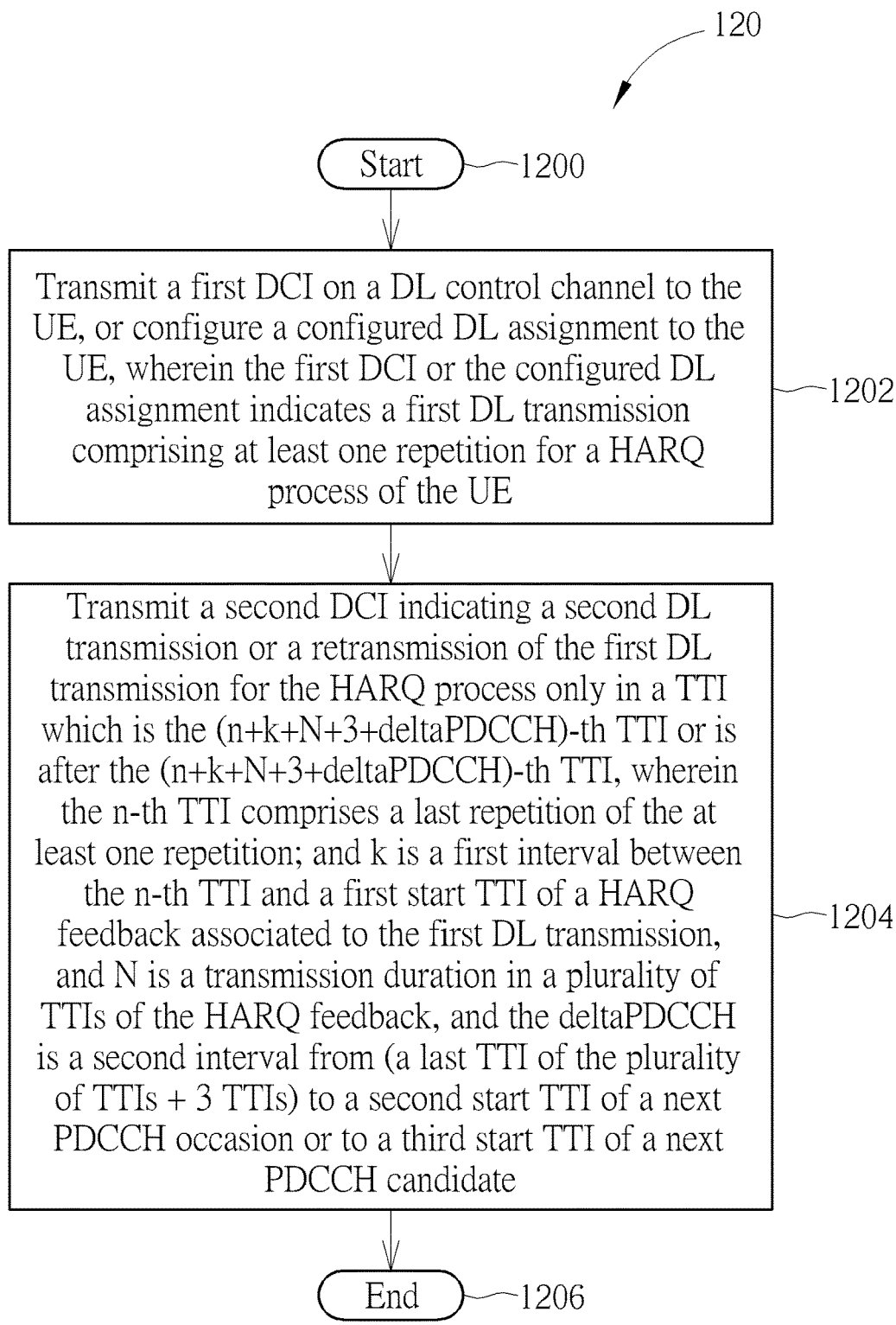
FIG. 12 is a flowchart of a process according to an example of the present invention.

FIG. 12 is a flowchart of a process 120 according to an example of the present invention. The process 120 can be utilized in a BS in a network, for handling a HARQ RTT Timer for a UE. The process 120 includes the following steps:

Step 1200: Start.

Step 1202: Transmit a first DCI on a DL control channel to the UE, or configure a configured DL assignment to the UE, wherein the first DCI or the configured DL assignment indicates a first DL transmission comprising at least one repetition for a HARQ process of the UE.

Step 1204: Transmit a second DCI indicating a second DL transmission or a retransmission of the first DL transmission for the HARQ process only in a TTI which is the (n+k+N+3+deltaPDCCH)-th TTI or is after the (n+k+N+3+deltaPDCCH)-th TTI, wherein the n-th TTI comprises a last repetition of the at least one repetition; and k is a first interval between the n-th TTI and a first start TTI of a HARQ feedback associated to the first DL transmission, and N is a transmission duration in a plurality of TTIs of the HARQ feedback, and the deltaPDCCH is a second interval from (a last TTI of the plurality of TTIs+3 TTIs) to a second start TTI of a next PDCCH occasion or to a third start TTI of a next PDCCH candidate.

Step 1206: End.

According to the process 120, the BS does not transmit the second DCI before the (n+k+N+3+deltaPDCCH)-th TTI or before the (n+k+N+3)-th TTI. The UE considers the second DCI is invalid when the UE receives the second DCI before the (n+k+N+3+deltaPDCCH)-th TTI. The description for the process 100 (e.g., the deltaPDCCH, the next PDCCH occasion or the next PDCCH candidate) may be applied to the process 120, and is not repeated herein.

Realization of the process 120 is not limited to the above description. The following examples may be applied to the processes above.

In one example, the deltaPDCCH is larger than or equals to 0.

In one example, the DL control channel is a PDCCH, an enhanced PDCCH (EPDCCH), a Machine Type Communication (MTC) PDCCH (MPDCCH) or a Narrowband PDCCH (NPDCCH). The TTI may be a subframe, a time slot or 1, 2, 3 or 4 OFDM symbols.

In one example, the TTI is a subframe (1 ms), 1 time slot (e.g., 7 OFDM symbols, or 0.5 ms) or 2 OFDM symbols.

In one example, a PDCCH occasion is an occurrence of a PDCCH search space in the timeline, and the occurrence of the PDCCH search space is configured by the BS as defined in a 3GPP specification.

In one example, the at least one repetition includes one repetition or a plurality of repetitions. A first number of the at least one repetition of the DL transmission may be configured by the first DCI or a RRC message (e.g., RRC-ConnectionReconfiguration message). A second number of the at least one repetition of the HARQ feedback is configured by the first DCI or by the RRC message. The UE transmits the HARQ feedback in the number of the at least one repetitions.

In one example, the UE monitors the DL control channel, when the drx-InactivityTimer, the onDurationTimer or the drx-ULRetransmissionTimer is running. In one example, the UE does not monitor the control channel, when none of the drx-InactivityTimer, the onDurationTimer and the drx-ULRetransmissionTimer is running. That is, the UE may go to a sleep mode to save power consumption, when none of the drx-InactivityTimer, the onDurationTimer and the drx-ULRetransmissionTimer is running. The BS should transmit a DCI on the DL control channel to the UE, when the drx-InactivityTimer, the onDurationTimer or the drx-ULRetransmissionTimer is running in the UE. In one example, the BS may know whether the drx-InactivityTimer is running by starting or restarting a BS drx-InactivityTimer corresponding to the drx-InactivityTimer running in the UE. The BS may know whether the onDurationTimer is running by maintaining a BS onDurationTimer corresponding to the onDurationTimer running in the UE. The BS may know whether the drx-ULRetransmissionTimer is running by starting or restarting a BS drx-ULRetransmissionTimer corresponding to the drx-ULRetransmissionTimer running in the UE.

It should be noted that "the interval between a TTI A and a TTI B" mentioned above means that the interval only include TTI(s) therebetween while the TTI A and the TTI B are not included. "The interval from a TTI C to a TTI D" means that the interval includes the TTI C, the TTI D and TTI(s) therebetween.

Figure 13:
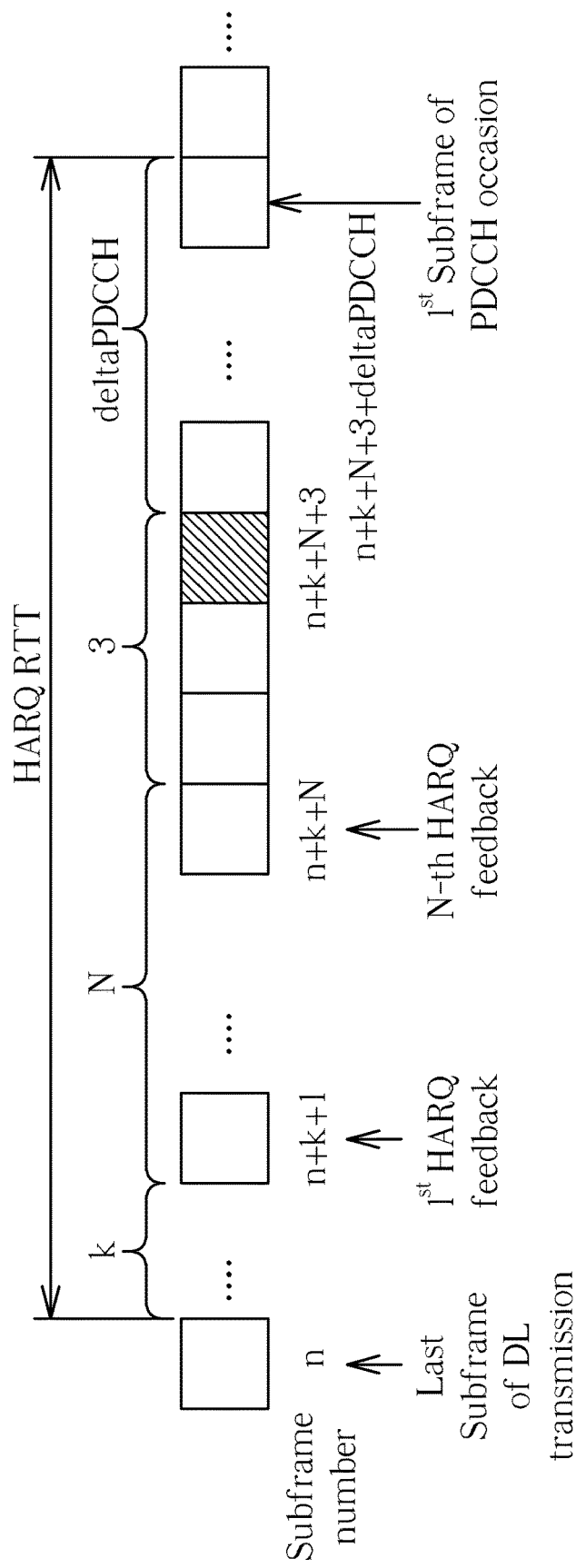
FIG. 13 is a schematic diagram according to an example of the present invention.

FIG. 13 illustrates a length of the HARQ RTT Timer is determined according to any of the processes above. The HARQ RTT Timer is set to (k+3+N+deltaPDCCH) TTIs, where k is the interval between the last TTI of the downlink transmission and the first TTI of the associated HARQ feedback transmission and N is the transmission duration in TTIs of the associated HARQ feedback, and deltaPDCCH is the interval from (the last TTI of the associated HARQ feedback transmission+4 TTIs) to the first TTI of the next PDCCH occasion.

Those skilled in the art should readily make combinations, modifications or alternations on the abovementioned description and examples. Any of the abovementioned description, steps or processes including suggested steps can be realized by means that could be hardware, software, firmware, an electronic system, or combination thereof. An example of the means may be the communication device 20. Any of the above processes and examples above may be compiled into the program code 214.

To sum up, the present invention provides a device and a method for handling a HARQ RTT Timer. "The TTI of the HARQ transmission" is clearly illustrated in the invention. Thus, the problem in the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a Hybrid Automatic Repeat Request (HARQ) Round-trip Time (RTT) Timer, comprising:
 a storage device, for storing instructions of:
 receiving a first downlink (DL) control information (DCI) on a DL control channel transmitted by a base station (BS), or being configured a configured DL assignment, wherein the first DCI or the configured DL assignment indicates a first DL transmission comprising at least one repetition for a HARQ process of the communication device; and
 starting a HARQ RTT Timer for the HARQ process, wherein the HARQ RTT Timer counts a time duration from a (n+1)-th transmission time interval (TTI) to a (n+k+N+3+deltaPDCCH)-th TTI, wherein the n-th TTI comprises a last repetition of the at least one repetition; and k is a first interval between the n-th TTI and a first start TTI of a HARQ feedback associated to the first DL transmission, and N is a transmission duration in a plurality of TTIs of the HARQ feedback, and the deltaPDCCH is a second interval from (a last TTI of the plurality of TTIs+4 TTIs) to a second start TTI of a next Physical DL Control Channel (PDCCH) occasion or to a third start TTI of a next PDCCH candidate; and
 a processing circuit, coupled to the storage device, configured to execute the instructions stored in the storage device.

2. The communication device of claim 1, wherein the next PDCCH occasion is an occurrence of a PDCCH search space in a timeline, and the occurrence of the PDCCH search space is configured by the BS.

3. The communication device of claim 1, wherein the deltaPDCCH is larger than or equals to 0.

4. The communication device of claim 1, wherein a first number of the at least one repetition of the first DL transmission is configured by the first DCI or by a first Radio Resource Control (RRC) message; and a second number of the at least one repetition of the HARQ feedback is configured by the first DCI or by a second RRC message.

5. The communication device of claim 1, wherein the storage device stores the instruction of:
 receiving a discontinuous reception (DRX) configuration comprising a configuration of a drx-InactivityTimer, an onDurationTimer and a drx-ULRetransmissionTimer; and monitoring the DL control channel, when the drx-InactivityTimer, the onDurationTimer or the drx-ULRetransmissionTimer is running.

6. A communication device for handling a Hybrid Automatic Repeat Request (HARQ) Round-trip Time (RTT) Timer, comprising:
  a storage device, for storing instructions of:
  receiving a first downlink (DL) control information (DCI) on a DL control channel transmitted by a base station (BS), or being configured a configured uplink (UL) grant, wherein the first DCI or the configured UL grant indicates the communication device to transmit at least one repetition of a first UL transmission using a HARQ process for the first UL transmission; and
  starting an UL HARQ RTT Timer for the HARQ process, wherein the UL HARQ RTT Timer counts a time duration from a (n+1)-th transmission time interval (TTI) to a (n+4+deltaPDCCH)-th TTI, wherein the n-th TTI comprises a last repetition of the at least one repetition, and the deltaPDCCH is an interval from (n+5)-th TTI to a first start TTI of a next Physical DL Control Channel (PDCCH) occasion or to a second start TTI of a next PDCCH candidate; and
  a processing circuit, coupled to the storage device, configured to execute the instructions stored in the storage device.

7. The communication device of claim 6, wherein the next PDCCH occasion is an occurrence of a PDCCH search space in a timeline, and the occurrence of the PDCCH search space is configured by the BS.

8. The communication device of claim 6, wherein the deltaPDCCH is larger than or equals to 0.

9. The communication device of claim 6, wherein a first number of the at least one repetition of the first UL transmission is configured by the first DCI or by a first Radio Resource Control (RRC) message; and a second number of the at least one repetition of the HARQ feedback is configured by the first DCI or by a second RRC message.

10. The communication device of claim 6, wherein the storage device stores the instruction of:
  receiving a discontinuous reception (DRX) configuration comprising a configuration of a drx-InactivityTimer, an onDurationTimer and a drx-ULRetransmissionTimer; and
  monitoring the DL control channel, when the drx-InactivityTimer, the onDurationTimer or the drx-ULRetransmissionTimer is running.

11. A communication device for handling a Hybrid Automatic Repeat Request (HARQ) Round-trip Time (RTT) Timer, comprising:
  a storage device, for storing instructions of:
  receiving a first downlink (DL) control information (DCI) on a DL control channel transmitted by a base station (BS), or being configured a configured DL assignment, wherein the first DCI or the configured DL assignment indicates a first DL transmission comprising at least one repetition for a HARQ process of the communication device; and
  starting a HARQ RTT Timer for the HARQ process, wherein the HARQ RTT Timer counts a time duration from a (n+1)-th transmission time interval (TTI) to a (n+k+N+3+deltaPDCCH)-th TTI, wherein the n-th TTI comprises a last repetition of the at least one repetition; and k is a first interval between the n-th TTI and a first start TTI of a HARQ feedback associated to the first DL transmission, and N is a transmission duration in a plurality of TTIs of the HARQ feedback, and the deltaPDCCH is a second interval from (a last TTI of the plurality of TTIs+3 TTIs) to a second start TTI of a next Physical DL Control Channel (PDCCH) occasion or to a third start TTI of a next PDCCH candidate, if (the first start TTI of the HARQ feedback+3 TTIs) is earlier than the second start TTI of the next PDCCH occasion or the third start TTI of the next PDCCH candidate; and
  a processing circuit, coupled to the storage device, configured to execute the instructions stored in the storage device.

12. The communication device of claim 11, wherein the deltaPDCCH is 1, if (a last TTI of the HARQ feedback+3 TTIs) is or is later than the second start TTI of the next PDCCH occasion or the third start TTI of the next PDCCH candidate.

13. The communication device of claim 11, wherein the BS is not allowed to transmit a second DCI to the communication device before the (n+k+N+3+deltaPDCCH)-th TTI, if the HARQ feedback is a HARQ negative acknowledgement (NACK), wherein the second DCI indicates a retransmission of the first DL transmission for the HARQ process.

14. The communication device of claim 11, wherein the BS is not allowed to transmit a third DCI to the communication device before the (n+k+N+3+deltaPDCCH)-th TTI, if the HARQ feedback is a HARQ acknowledgement (ACK), wherein the third DCI indicates a second DL transmission for the HARQ process.

15. The communication device of claim 11, wherein the storage device stores the instruction of:
  receiving a discontinuous reception (DRX) configuration comprising a configuration of a drx-InactivityTimer, an onDurationTimer and a drx-ULRetransmissionTimer; and
  monitoring the DL control channel, when the drx-InactivityTimer, the onDurationTimer or the drx-ULRetransmissionTimer is running.

* * * * *